(12) United States Patent
Saito et al.

(10) Patent No.: US 8,904,187 B2
(45) Date of Patent: *Dec. 2, 2014

(54) SECURE BIOMETRIC VERIFICATION OF IDENTITY

(75) Inventors: Tamio Saito, San Jose, CA (US); Wayne Drizin, San Jose, CA (US); Takashi Aida, San Jose, CA (US)

(73) Assignee: IVI Holdings Ltd., Boulder, CO (US)

( * ) Notice: Subject to any disclaimer, the term of this patent is extended or adjusted under 35 U.S.C. 154(b) by 748 days.

This patent is subject to a terminal disclaimer.

(21) Appl. No.: 11/864,815

(22) Filed: Sep. 28, 2007

(65) Prior Publication Data
US 2008/0019578 A1 Jan. 24, 2008

Related U.S. Application Data

(63) Continuation of application No. 10/659,834, filed on Sep. 10, 2003, now Pat. No. 7,278,025.

(60) Provisional application No. 60/484,692, filed on Jul. 3, 2003, provisional application No. 60/433,254, filed on (Continued)

(51) Int. Cl.
*G06F 21/00* (2013.01)
(Continued)

(52) U.S. Cl.
CPC .......... *H04L 9/3271* (2013.01); *G07C 9/00087* (2013.01); *G06K 19/07354* (2013.01); *G06K 19/07* (2013.01); *G07C 2009/00095* (2013.01); *H04L 2209/805* (2013.01); *H04L 9/3231* (2013.01)
USPC ......................................................... 713/186

(58) Field of Classification Search
None
See application file for complete search history.

(56) References Cited

U.S. PATENT DOCUMENTS

| 3,383,657 A | 5/1968 | Claassen et al. |
| 4,222,516 A | 9/1980 | Badget et al. |

(Continued)

FOREIGN PATENT DOCUMENTS

| DE | 19618144 | 4/1997 |
| DE | 19648767 | 6/1997 |

(Continued)

OTHER PUBLICATIONS

IDsmart, LLC. Participates at 12th Annual Cards & Payments Asia Forum—Apr. 25-27, 2007, *Business Wire*, Apr. 19, 2007.

(Continued)

*Primary Examiner* — Brandon Hoffman
(74) *Attorney, Agent, or Firm* — Marsh Fischmann & Breyfogle LLP; Daniel J. Sherwinter

(57) ABSTRACT

A high security identification card includes an on-board memory for stored biometric data and an on-board sensor for capturing live biometric data. An on-board processor on the card performs a matching operation to verify that the captured biometric data matches the locally stored biometric data. Only if there is a positive match is any data transmitted from the card for additional verification and/or further processing. Preferably, the card is ISO SmartCard compatible. In one embodiment, the ISO SmartCard functions as a firewall for protecting the security processor used for storing and processing the protected biometric data from malicious external attack via the ISO SmartCard interface. In another embodiment, the security processor is inserted between the ISO SmartCard Interface and an unmodified ISO SmartCard processor and blocks any external communications until the user's fingerprint has been matched with a previously registered fingerprint. Real-time feedback is provided while the user is manipulating his finger over the fingerprint sensor, thereby facilitating an optimal placement of the finger over the sensor. The card may be used to enable communication with a transactional network or to obtain physical access into a secure area.

30 Claims, 10 Drawing Sheets

Related U.S. Application Data

Dec. 13, 2002, provisional application No. 60/429,919, filed on Nov. 27, 2002, provisional application No. 60/409,715, filed on Sep. 10, 2002, provisional application No. 60/409,716, filed on Sep. 10, 2002.

(51) Int. Cl.
*G07C 9/00* (2006.01)
*G06K 19/073* (2006.01)
*G06K 19/07* (2006.01)
*H04L 9/32* (2006.01)

(56) References Cited

U.S. PATENT DOCUMENTS

| | | | |
|---|---|---|---|
| 4,246,568 A | 1/1981 | Peterson | |
| 4,253,086 A | 2/1981 | Szwarcbier | |
| 4,353,056 A | 10/1982 | Tsikos | |
| 4,582,985 A | 4/1986 | Löfberg | |
| 4,586,441 A | 5/1986 | Zekich | |
| 4,712,103 A | 12/1987 | Gotanda | |
| 4,773,093 A | 9/1988 | Higgins et al. | |
| 4,837,568 A | 6/1989 | Snapper | |
| 4,910,393 A | 3/1990 | Gercekci et al. | |
| 4,926,479 A * | 5/1990 | Goldwasser et al. | 713/180 |
| 4,983,036 A | 1/1991 | Froelich | |
| 4,993,068 A | 2/1991 | Piosenka et al. | |
| 5,053,608 A | 10/1991 | Senanayake | |
| 5,055,658 A | 10/1991 | Cockburn | |
| 5,079,949 A | 1/1992 | Tamori | |
| 5,180,901 A | 1/1993 | Hiramatsu | |
| 5,268,963 A | 12/1993 | Monroe et al. | |
| 5,280,527 A | 1/1994 | Gullman et al. | |
| 5,400,662 A | 3/1995 | Tamori | |
| 5,429,006 A | 7/1995 | Tamori | |
| 5,503,029 A | 4/1996 | Tamori | |
| 5,515,738 A | 5/1996 | Tamori | |
| 5,526,701 A | 6/1996 | Tamori | |
| 5,577,120 A | 11/1996 | Penzias | |
| 5,585,787 A | 12/1996 | Wallerstein | |
| 5,590,199 A | 12/1996 | Krajewski et al. | |
| 5,623,552 A | 4/1997 | Lane | |
| 5,677,955 A | 10/1997 | Doggett et al. | |
| 5,721,781 A | 2/1998 | Deo et al. | |
| 5,754,675 A | 5/1998 | Valadier | |
| 5,815,252 A | 9/1998 | Price-Francis | |
| 5,825,880 A | 10/1998 | Sudia et al. | |
| 5,844,218 A | 12/1998 | Kawan et al. | |
| 5,852,670 A | 12/1998 | Setlak et al. | |
| 5,867,802 A | 2/1999 | Borza | |
| 5,892,824 A | 4/1999 | Beatson et al. | |
| 5,907,627 A | 5/1999 | Borza | |
| 5,952,641 A | 9/1999 | Korshun | |
| 5,978,495 A | 11/1999 | Thomopoulos et al. | |
| 5,995,630 A | 11/1999 | Borza | |
| 5,999,637 A | 12/1999 | Toyoda et al. | |
| 6,094,589 A | 7/2000 | Schmitt | |
| 6,108,636 A | 8/2000 | Yap et al. | |
| 6,219,439 B1 | 4/2001 | Burger | |
| 6,256,690 B1 | 7/2001 | Carper | |
| 6,320,975 B1 | 11/2001 | Vieweg | |
| 6,325,285 B1 | 12/2001 | Baratelli | |
| 6,335,688 B1 | 1/2002 | Sweatte | |
| 6,338,435 B1 | 1/2002 | Carper | |
| 6,360,953 B1 | 3/2002 | Lin et al. | |
| 6,385,729 B1 * | 5/2002 | DiGiorgio et al. | 726/9 |
| 6,390,374 B1 | 5/2002 | Carper et al. | |
| 6,439,464 B1 | 8/2002 | Fruhauf et al. | |
| 6,441,482 B1 | 8/2002 | Foster | |
| 6,456,980 B1 | 9/2002 | Powell | |
| 6,480,935 B1 | 11/2002 | Carper et al. | |
| 6,523,745 B1 | 2/2003 | Tamori | |
| 6,539,101 B1 | 3/2003 | Black | |
| 6,547,130 B1 | 4/2003 | Shen | |
| 6,581,712 B1 | 6/2003 | Nathans | |
| 6,618,807 B1 | 9/2003 | Wang et al. | |
| 6,853,087 B2 | 2/2005 | Neuhaus et al. | |
| 6,980,672 B2 | 12/2005 | Saito et al. | |
| 7,111,324 B2 | 9/2006 | Elteto et al. | |
| 7,278,025 B2 | 10/2007 | Saito et al. | |
| 2001/0033220 A1 | 10/2001 | Stone et al. | |
| 2001/0047479 A1 | 11/2001 | Bromba et al. | |
| 2002/0007459 A1 | 1/2002 | Cassista et al. | |
| 2002/0028003 A1 | 3/2002 | Krebbs et al. | |
| 2002/0083022 A1 | 6/2002 | Algazi | |
| 2002/0088632 A1 | 7/2002 | Salatino et al. | |
| 2002/0095587 A1 | 7/2002 | Doyle et al. | |
| 2002/0100802 A1 | 8/2002 | Sehr | |
| 2002/0111164 A1 | 8/2002 | Ritter | |
| 2002/0118096 A1 | 8/2002 | Hoyos et al. | |
| 2003/0046228 A1 | 3/2003 | Berney | |
| 2003/0085286 A1 | 5/2003 | Kelley et al. | |
| 2004/0179718 A1 | 9/2004 | Chou | |

FOREIGN PATENT DOCUMENTS

| | | | |
|---|---|---|---|
| EP | 0457398 | 11/1991 | |
| EP | 0 923 018 | 6/1998 | |
| EP | 0 864 996 | 9/1998 | |
| EP | 1074949 | 2/2001 | |
| EP | 1074949 A1 * | 2/2001 | G07C 9/00 |
| EP | 1006479 | 6/2002 | |
| GB | 2 254 466 A | 10/1992 | |
| GB | 2336005 A | 10/1999 | |
| GB | 2 354 612 A | 3/2001 | |
| JP | 61101886 | 5/1986 | |
| JP | 3171385 | 7/1991 | |
| JP | 4153896 | 5/1992 | |
| WO | WO 98/01820 | 1/1998 | |
| WO | WO 01/48740 | 3/2001 | |
| WO | WO 01/35334 A1 | 5/2001 | |
| WO | WO 01/59686 A1 | 8/2001 | |
| WO | WO 02/01328 A2 | 1/2002 | |

OTHER PUBLICATIONS

IDsmart™ SensorCard™ website http:www.id-smart.com.
Olivier, "Secure biometric credentials from IDsmart," Apr. 17, 2007, http://securityfanatics.com/info/Biometric-secure-credentials-IDsmart.
Rees, "Intag's Smartcard Set to Incorporate Biometrics," *Financial Technology Insight*, Elsevier Science Ltd., Aug. 1994, p. 5.
International Search Report PCT/US2005/013896.
International Search Report PCT/US2003/28602.

* cited by examiner

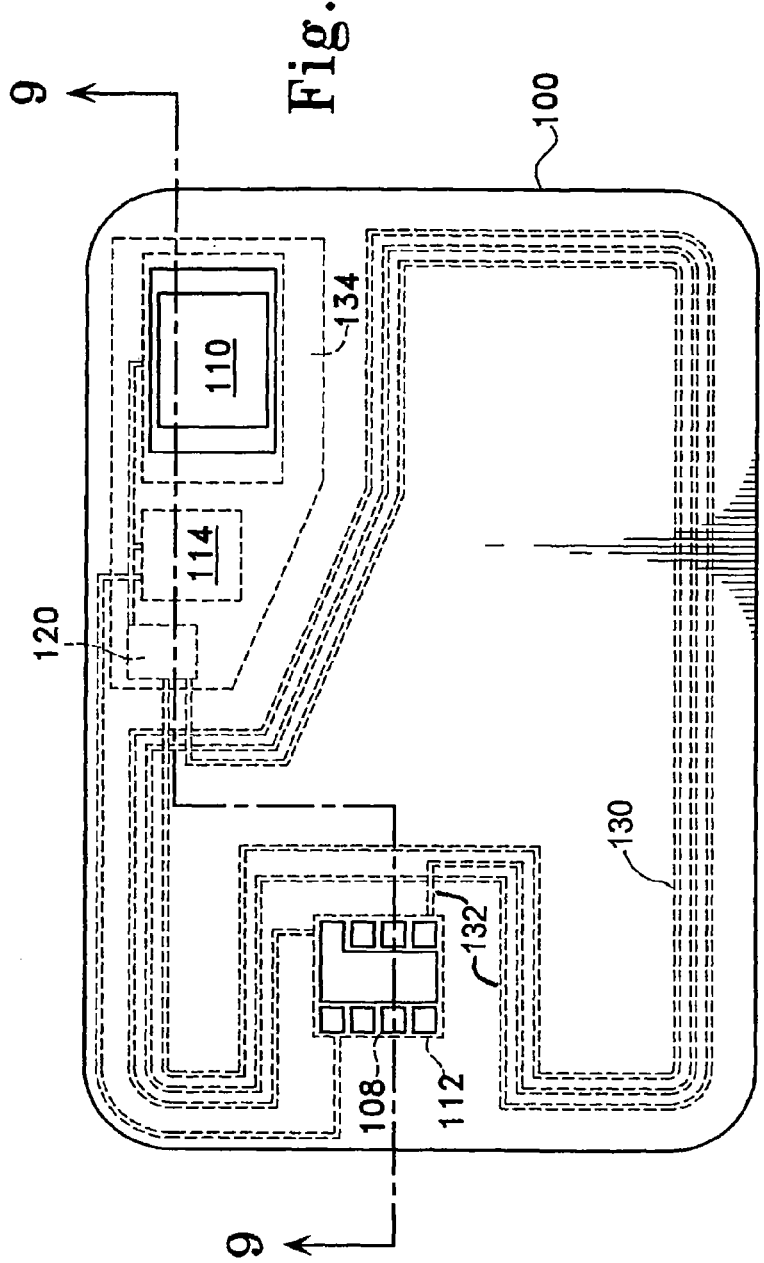
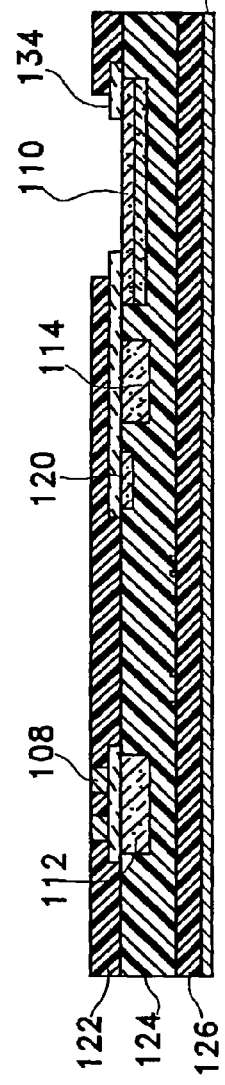

SECURE BIOMETRIC VERIFICATION OF IDENTITY

CROSS-REFERENCES TO RELATED APPLICATIONS

This application is a continuation of and claims priority from U.S. Nonprovisional patent application Ser. No. 10/659,834 filed Sep. 10, 2003, which is U.S. Pat. No. 7,278,025 issued on Oct. 2, 2007 which is based on, and claims priority from, provisional patent applications 60/409,716 filed Sep. 10, 2002, 60/409,715 filed Sep. 10, 2002, 60/429,919 filed Nov. 27, 2002, 60/433,254 filed Dec. 13, 2002, and 60/484,692 filed Jul. 3, 2003, which are hereby incorporated by reference in their entirety.

BACKGROUND OF THE INVENTION

Computerization and especially Internet technology has been providing ever greater access to data, including financial data, medical data, personal data, and with means to expedite financial and other transactions in which confidential data is updated or exchanged.

Passwords are commonly used to maintain the confidentiality of such data; however, passwords are frequently based on a birth date or phone number that is simple to guess and that is not secure at all. Furthermore, even a complicated randomly generated password can often be readily stolen. Password-based data accessing systems are thus vulnerable to criminal attack with resultant risk and damage to industry and the economy and even to people's lives. Accordingly, there is a need for an improved method for securing data and protecting that data from unauthorized access.

Biometric data can include precise details that are difficult to capture but easy to analyze (such as a sequence of fingerprint minutia) or overall patterns that are easy to capture but difficult to analyze (such as the spatial characteristics of adjacent fingerprint whorls).

Encryption algorithms exist that require a digital key available only to authorized users. Without the proper key, the encrypted data can be decrypted into a usable format only with a substantial investment of time and processing resources, and even then, only if certain characteristics of the unencrypted data are known (or at least are predictable).

Japan Published Patent Application JP 60-029868 dated Feb. 15, 1985 in the name of Tamio Saito teaches an individual identification system that employs an identity card with an integrated memory for registering enciphered biometric data obtained from the card holder. The biometric data may include a voiceprint, fingerprint, physical appearance, and/or a biological assay. In use, the data on the card is read and deciphered for comparison with corresponding data captured from the person presenting the card. Such a system permits a registered individual to be positively identified with a high degree of accuracy. However, because the biometric data is obtained and processed by external equipment, it is difficult to protect the information stored on the card against possible alteration and/or identity theft.

An improved identification card has been proposed which includes a data driven multi-processor chip on the card to provide a hardware firewall that both encrypts and isolates the biometric data stored on the card, thereby providing substantially greater protection against unauthorized alteration of the stored data. However, the actual matching process was performed in the same external reader terminal that captured the live biometric data, and was thus still potentially vulnerable to external fraudulent manipulation.

BRIEF SUMMARY OF THE INVENTION

A first embodiment of a high security identification card includes not only an on-board memory for the stored biometric data, but also an on-board sensor for capturing the live biometric data. A remote authentication system maintains a secure database including the biometric data. An on-board processor on the card performs a preliminary matching operation to verify that the captured biometric data matches the locally stored biometric data. Only if there is a positive local match is any captured data or any sensitive stored data transmitted to the remote authentication system for additional verification and further processing. As a further protection against malicious attack, the locally stored data is preferably different from the remotely stored data, and the local match and the remote match preferably are conducted utilizing different matching algorithms. Thus even if the card, the locally stored data, and/or the local terminal to which the card is connected is ever compromised, there is a high probability that the remote authorization system will still be able to detect the attempted intrusion.

A second embodiment also includes an on-board memory for the stored biometric data, an on-board sensor for capturing the live biometric data and an on-board processor; however, in that embodiment the entire matching process is performed by the on-board processor and both the originally captured biometric data and any other private information stored in the on-board memory are not made available to any external processes. Instead, only a verification message is generated in response to a successful match between the newly captured biometric data and the previously captured biometric data. The verification message causes the card to function in a manner similar to a conventional ISO SmartCard upon the successful/unsuccessful entry of a conventional Personal Identification Number (PIN), but with the additional security afforded by a more secure verification process. In either of those embodiments, the stored biometric data and any associated locally stored encryption algorithm or encryption key is preferably loaded onto the card at the time of original issuance to the card holder in a manner that discourages any subsequent external access, thereby further enhancing the integrity of stored biometric data and of the entire verification process.

In one embodiment, the ISO SmartCard functions as a firewall for protecting the security processor used for storing and processing the protected biometric data from malicious external attack via the ISO SmartCard interface. In another embodiment, the security processor is inserted between the ISO SmartCard Interface and an unmodified ISO SmartCard processor and blocks any external communications until the user's fingerprint has been matched with a previously registered fingerprint.

In one preferred embodiment of a high security identification card with on-board fingerprint matching capability, real-time feedback is provided while the user is manipulating his finger over the fingerprint sensor, thereby facilitating an optimal placement of the finger over the sensor. This feedback not only reduces computational complexity but also provides additional means for discriminating between an inexperienced user and a fraudulent user, thereby further reducing the probability of false negatives and/or false positives. In another preferred embodiment, the fingerprint sensor is retained in a carrier that provides additional stiffness.

In one exemplary application, the captured biometric data and/or an indication of the cardholder's identity is encrypted and input to a transactional network including a financial institution and a separate authentication server priori to any grant of on-line access to confidential data or to any automated process for completing a secure transaction. In another exemplary application, the output from the card is used to obtain physical access into a secure area. In either application, a record of successful and unsuccessful access attempts can be maintained either on the card or at an external security server, or both.

BRIEF DESCRIPTION OF THE DRAWINGS

FIG. 8 shows a second embodiment of a smart card with on board biometric verification that can be connected to a local terminal either wireless or by means of an electrical connector.

FIG. 9 is a cross section through the card of FIG. 8.

DETAILED DESCRIPTION OF THE INVENTION

The phrase "smart card" or "intelligent card" is used herein in a generic sense to refer to any physical object that is small enough to be held in the hand, worn about the neck, or otherwise carried about the person and that includes a microprocessor that is capable of storing, processing and communicating digitally encoded information concerning or otherwise related to an individual cardholders One well known example of such a smart card is the ISO (International Standards Organization) SmartCard, which has the same physical size and shape of a conventional credit card, but which includes flash memory for storage of user specified data and a microprocessor which can be programmed with a powerful encryption algorithm that indicates whether or not a PIN (Personal Identification Number) received from a user terminal matches an encrypted PIN stored on the card, thereby providing a higher degree of confidence that the person presenting the card is the real card holder than would be possible in a verification system that merely relies on a visual comparison of signatures and/or physical likeness.

Figure 1:
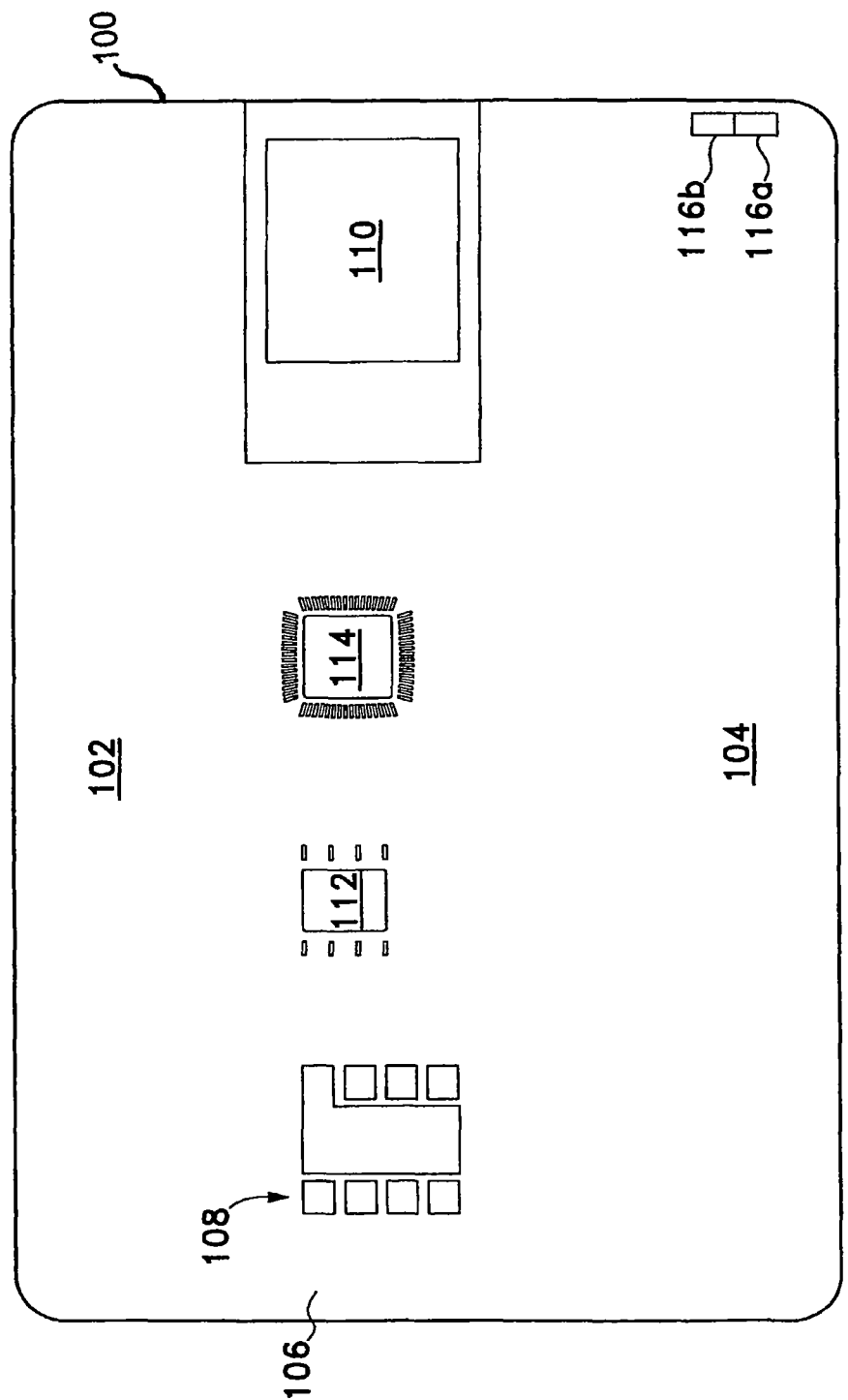
FIG. 1 shows one embodiment of a smart card with on-board biometric verification of the identity of the person presenting the card.

Reference should now be made to FIG. 1, which shows one embodiment of a smart card with on-board biometric verification. The card 100 is generally made of a plastic material and has the overall appearance of a conventional credit card, of approximate dimensions as specified in ISO 7816 of approximately 53.98×85.6 mm and thickness of approximately 0.76 mm or more.

Similar to a conventional credit card, card 100 includes a free upper region 102 extending along the entire transverse width of the card for supporting a magnetic stripe (as specified by ISO 7811-2 & 7811-6) on the back surface of the card, on which may be stored conventionally encoded alphanumeric information about the card holder and any associated account, thereby permitting card 100 to be used in a conventional magnetic stripe reader. However, because any data embedded in the magnetic stripe can easily be altered, such a magnetic stripe is intended only for use in certain applications where the need for backwards compatibility with older magnetic stripe based terminals outweighs the potential degradation of security that a magnetic stripe brings to the system.

Upper region 102 may also be used to support various fraud prevention measures, such as a tamper-resistant colored photograph of the cardholder and/or a holographic logo of the card issuer. The lower region 104 of card 100 may be used in conventional fashion for embossed information (as specified by ISO 7811-1) such as the name of the cardholder, a numerical account (or card) identifier, and an expiration date, to permit the use of card 100 in a conventional card imprinter.

Upper region 102 and lower region 104 are separated by a middle region 106 in which are embedded a set of 8 visible ISO SmartCard contact pads 108, which provide a convenient electrical connection between the card and corresponding contacts on a card reader. By this means, not only data, but also power, timing and control signals may be exchanged between the reader and the card as specified in ISO 7816-3.

On the right side of region 106 a sensor pad 110 is visible, which is used to capture fingerprint data from the cardholder's finger. The card preferably is provided with an ID code that is unique to sensor 110 or other electronic component embedded in the card; for example, a code in the format of a conventional IP and/or MAC address.

Also indicated schematically in FIG. 1 are several additional electronic components that cooperate with contact pad 108 and sensor 110 to provide greater functionality, and in particular better security, than would otherwise be possible.

In one embodiment, ISO SmartCard compatible processor 112 is directly connected to ISO contact pads 108 to provide an electrical connection with an external ISO compatible card reader (not shown) to thereby not only provide power to the on-board electronics, but also a means for communicating data between the card and any external communication software, security software, transactional software, and/or other application software running on the card reader or any associated computing devices networked with the card reader.

Although in the depicted embodiment the data path between the card 100 and the external card reader is in the form of a wired connection using an ISO specified SmartCard contact arrangement, it should be understood that in other embodiments, other transmission technologies can also be used such as USB or RS 232C or SPI (serial) connections, possibly over wireless RF (Radio Frequency), microwave and/or and IR (InfraRed) communication links.

Also, although the described embodiment receives power from the card reader, other embodiments could have an on-board source of power such as a solar cell or a battery. Such an on-board power source might be advantageous, for example, if the mechanical interface between the card 100 and a particular type of card reader is such that the fingerprint sensor 110 is not accessible to the user when the contacts 108 are connected to the corresponding connections inside the card reader, and thus the user's fingerprint data must be captured when the card 100 is not directly wired to the card reader.

Security Processor

As illustrated, Security processor 114 is connected between ISO processor 112 and sensor 110 for providing secure processing and storage of the captured data, as well as a secure "firewall" to protect the data and programs stored in its dedicated memory from any improper access attempt via the ISO processor 112, as will be described hereinafter. Such a firewall may be designed pass only encrypted data using an encryption key which is based on a uniquely assigned network address or that otherwise is unique to the particular card, such as data extracted from a previously stored fingerprint pattern or a uniquely assigned device number such as CPU number or a fingerprint sensor number. In another embodiment, the Firewall only passes data which contains unique identifying data from a previous transmission, or data. In yet other embodiments, the Firewall maintains different keys for different applications, and uses those keys to route the data to a respective different processor or memory partition.

In another embodiment (not illustrated), the Security processor 114 is directly connected to the ISO contacts 108 and acts as a secure gatekeeper between the ISO processor 112 and the ISO contacts 108. Such an alternate arrangement has the advantage of providing the additional security afforded by Security processor 114 and sensor 110, without any possible compromise of any security features that may already be incorporated into ISO processor 112.

Security processor 114 preferably includes a non-volatile semi-conductor or non-semi conductor memory, such as FRAM, OTP, E2PROM, MRAM, MROM, for storing a previously enrolled fingerprint pattern and/or other personal biometric information. In other embodiments, some or all of the functions of security processor 114 could be implemented in ISO processor 112 and/or some or all of the functions of ISO processor 112 could be implemented in security processor 114. Such a combined implementation could still maintain a software firewall between the various functions, which would be especially advantageous if the device was implemented with a process that did not permit any subsequent modification to the stored software programs. Alternatively, both processors 112, 114 could be separate processors in a single multi-processor device designed to protect each process from any interference from another process running in a different processor. One example of such a multi-processor devise is the DDMP (Data Driven Multiple Processor) from Sharp of Japan.

Although these various sensors, contacts, and other electronic components, as well as the printed circuits or other electrical wiring with which they are interconnected, are all preferably incorporated entirely inside the body of the card 100 such that they are protected from abrasion and external contaminants, the preferred location within the middle region 106 between upper region 102 and lower region 104 further protects them from possible damage from the conventional magnetic stripe readers, embossers, and imprinting equipment that mechanically interfaces with those other regions.

LED Feedback

LEDs 116a, 116b are controlled by security processor 114 and provide visible feedback to the user. In the illustrated embodiment, they are located in lower region 104 preferably at a location at the side edge of the card remote from contact pads 108. In any event, LEDs 116a, 116b are preferably located where they will not be damaged during any embossing process and where they will be visible when the card is inserted into a conventional ISO SmartCard reader and/or while the user's finger is placed over the fingerprint sensor 110. For example:

In Verify Mode:
RED blinking: Waiting for finger
stop blinking: Finger placed on sensor
RED blink once: Unable to match, ok to move finger
GREEN long blink once: Matched, ok to remove finger
In Enroll Mode
GREEN blinking: Waiting for finger
stop blinking: Finger placed on sensor
RED blink once: Unable to enroll, ok to move finger
GREEN blink once: Enrolled, ok to remove finger In Erase Mode
GREEN and RED blinking: Ready to erase
GREEN blink once: Erased The User is preferably given multiple opportunities to position his finger for a successful Match or Enroll before any negative report is transmitted. In one embodiment, a negative report is transmitted to the Authentication Server only if the User has removed his finger before receiving the green ok indication, or if a predetermined time limit has been exceeded. Such a process not only trains the User to make an optimal placement of his finger over the sensor, which not only reduces computational complexity but also permits the use of more discriminating thresholds. This visible feedback also provides a psychological basis for discriminating between an inexperienced user (who will typically keep trying until he achieves the proper placement) and a fraudulent user (who will typically not want to attract any attention and will leave before his malicious intentions are discovered). The net result is a significant reduction in the probability of false negatives and/or false positives.

Figure 2:
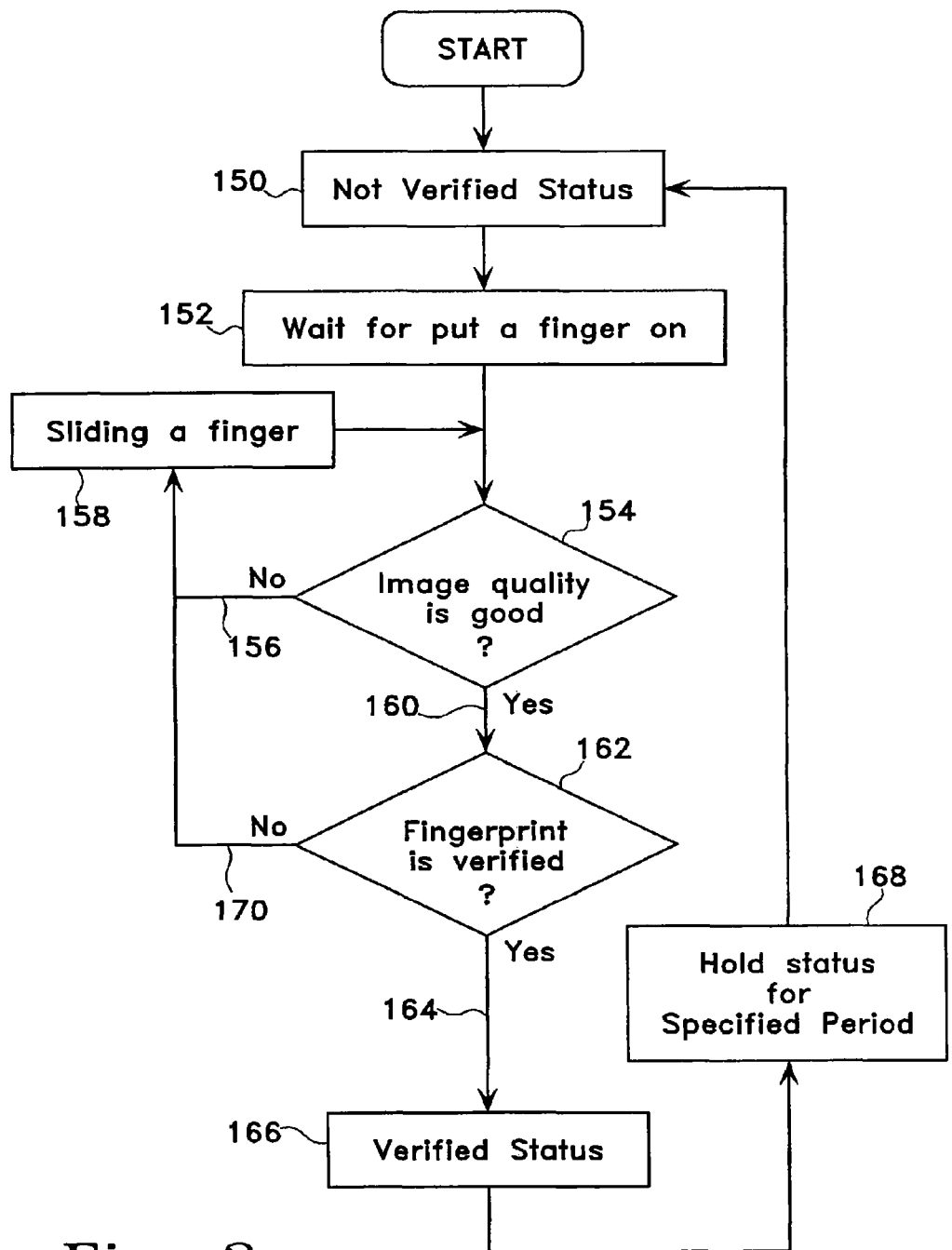
FIG. 2 is a flowchart showing an exemplary process for assisting the user in the optimal placement of a finger on the fingerprint sensor.

FIG. 2 illustrates an exemplary process for assisting the User to place his finger on sensor 110. In block 150, the RED LED 116b is blinking. Once a finger has been detected (block 152), the LED stops blinking and a test (block 154) made for image quality (defined elongated regions corresponding to the mountains and valleys of the finger's skin). If the quality is inadequate (NO branch 156), a single blink of RED LED 16b instructs the User to move his finger to a different position (block 158); otherwise (YES branch 160) a second test (block 162) is performed to determine whether the same finger has been placed in the same position as was used to enroll the User such that a relatively simple Matching algorithm can verify the live data corresponds to the stored data within a predetermined threshold, thereby verifying that the live finger is the same as the finger that was originally enrolled (YES branch 164) and the GREEN LED 16a is activated (block 166) for a sufficient time (block 168) to verify that a successful match has been made and the User may now remove his finger. Alternatively, if the matching threshold is not met (NO branch 170), a single blink of RED LED 16b (block 158) instructs the User to move his finger to a different position and the process is repeated.

Exemplary Network Architectures

Figure 3:
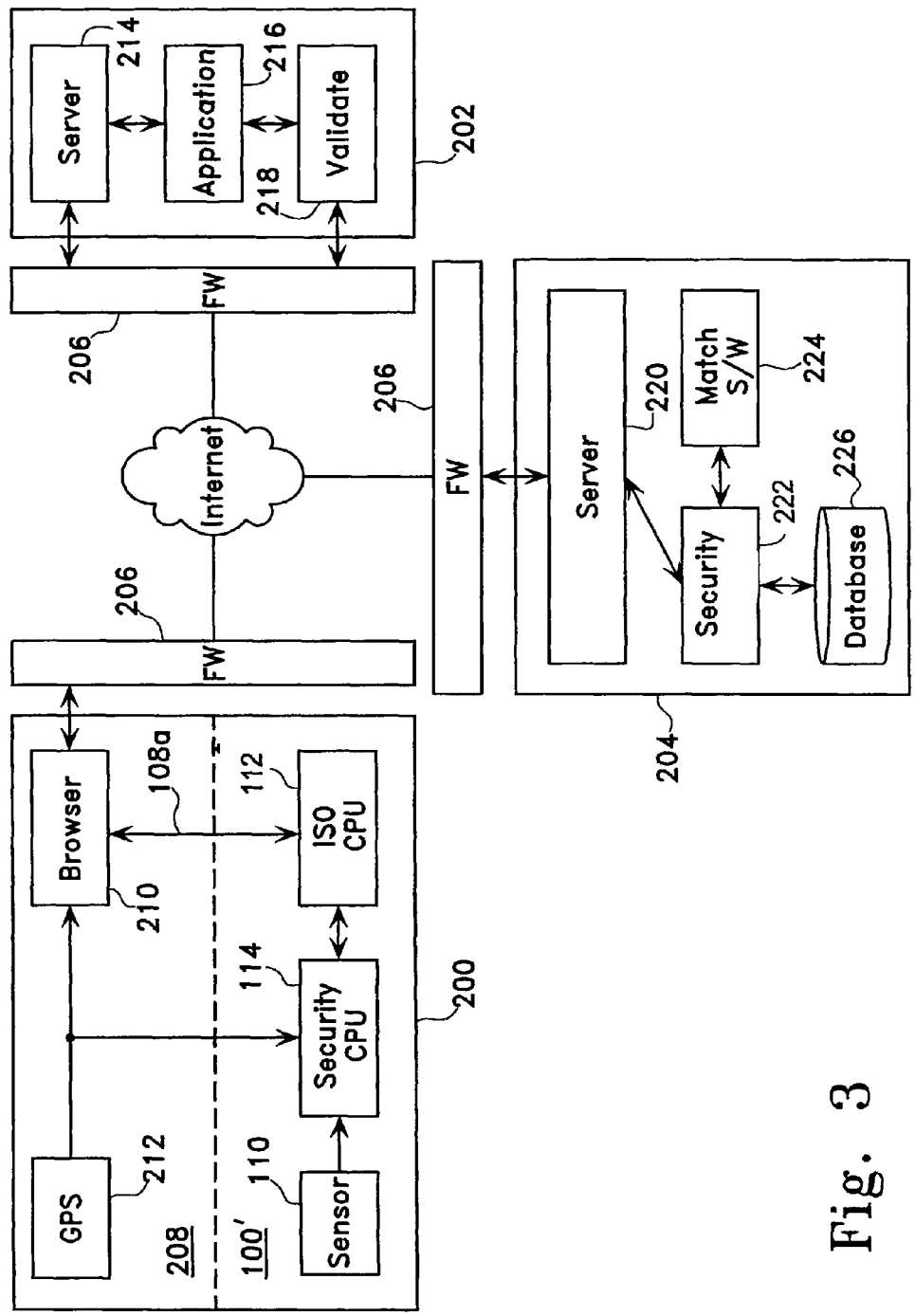
FIG. 3 is a functional block diagram of a biometric verification system capable of both local and remote verification of the identity of a person presenting a secure identification card.

Reference should now be made to FIG. 3 which illustrates one possible embodiment of a biometric verification system capable of both local and remote verification of the identity of a person presenting a secure identification card. It includes three main components: a client terminal 200, an application server 202 and an authentication server 204. The client terminal 200 includes functionality for live capture and local processing of a user's fingerprint, for encryption of the locally processed data, and for secure communication with the application server and the authentication server, preferably over the Internet using the IP/TCP addressing scheme and transmission protocol, with protection from malicious access being provided by conventional IP firewalls 206. In other embodiments the firewalls 206 may be provided with Filters and Encryption Encoder/Decoder which encode transmitted data after it has been verified to be Authorized data and which decode received data before deciding whether it is in fact Authorized data, for example using an encryption algorithm such as DES 128. By this means, the firewall 206 can classify data as Authorized or potentially Malicious based not only on the message header, but also based on the message content.

The Client Terminal 200 may be implemented as a dedicated web appliance, or may be implemented in software installed on a programmable desktop, notebook or other workstation or personal computer controlled by a general purpose operating system such as Windows XXX, OS X, Solaris XX, Linux or Free BSD. Client Terminal 200 preferably includes up-to-date "negative" databases (for example identities of lost or stolen cards, or restrictions on a particular card or group of cards) that afford an additional measure of security.

The application server 202 includes functionality for conducting a transaction or otherwise responding to instructions from the remote user at client terminal 200 after the user's identity has been verified by authentication server 204. The authentication server 204 includes functionality for secure communication with both client terminal 200 and application server 202, for storing authentic fingerprint data and other information concerning previously registered users, for comparing the stored data with the encrypted live data received from the client terminal 200, and for advising the application server 202 whether or not specified live fingerprint data matches specified stored fingerprint data.

More particularly, Client Terminal 200 further comprises two main components: a fixed card reader 208 component including an internet browser terminal 210 and a card reader interface 108*a* (which may be a simple USB cable terminating in a set of electrical contacts for forming respective electrical connection with ISO SmartCard contact pads 108) and a portable smart card component 100'. In one embodiment, the portable component 100' may be the previously described smart card 100 including the fingerprint sensor 110, the security processor 114 and the ISO SmartCard processor 112.

Application Server 202 further comprises an internet server interface including the firewall 206 and internet browser 214, as well as a transactional application module 216 and a validation module 218. In the event the application server and application module 216 are legacy devices that were not designed to communicate externally by means of the IPITCP protocol, the firewall 206 can be replaced with an appropriate protocol converter which incorporates the validation module 218 and which has a fixed IP address. Application Service Server may for example be operated by a third party who is willing to provide service through Internet to an authorized User.

Authentication Server 204 further comprises an internet server interface 220, a processing module 222 including a fingerprint matching algorithm 224, and a database 226 for storing fingerprint and other authentic information collected from individuals at the time those individuals were registered with the system and their identity was guaranteed to the satisfaction of the system operator. As a further security enhancement, the stored data for any particular individual is preferably not stored on the Application Server as a single sequence of information but rather each item is stored separately and any required indices or relationships connecting those items are accessible only by means of a corresponding key that is maintained as part of that individual's private data in the Authentication Server.

Location

In certain embodiments, the fixed reader 208 and/or the portable card 100" may also be equipped with an integral Global Positioning Satellite ("GPS") receiver 212 which can provide useful information about the current location of the reader and card at or about the time a particular transaction is taking place. In particular, the location data from GPS receiver 212 may be used to disable (either permanently or temporarily) the reader and/or the card in the event either is removed to a location at which their use is not authorized. Position may also be automatically determined by means other than GPS, for example using PHS (Japanese Cellular Telephone) caller location technology, or location sensors responsive to local variations in the earth's electromagnetic fields. In the particular case of a GPS equipped card, the various GPS components including antennae; signal amplification, AD converter and sample and hold circuits; and digital processor to calculate the position are preferably all part of a single integrated circuit or discrete devices mounted on a single circuit board, which is integrated with, embedded in, or laminated to the body of the card.

Card Architecture for ISO Card with On-Board Matching ISO Processor Interfaces

Figure 4:
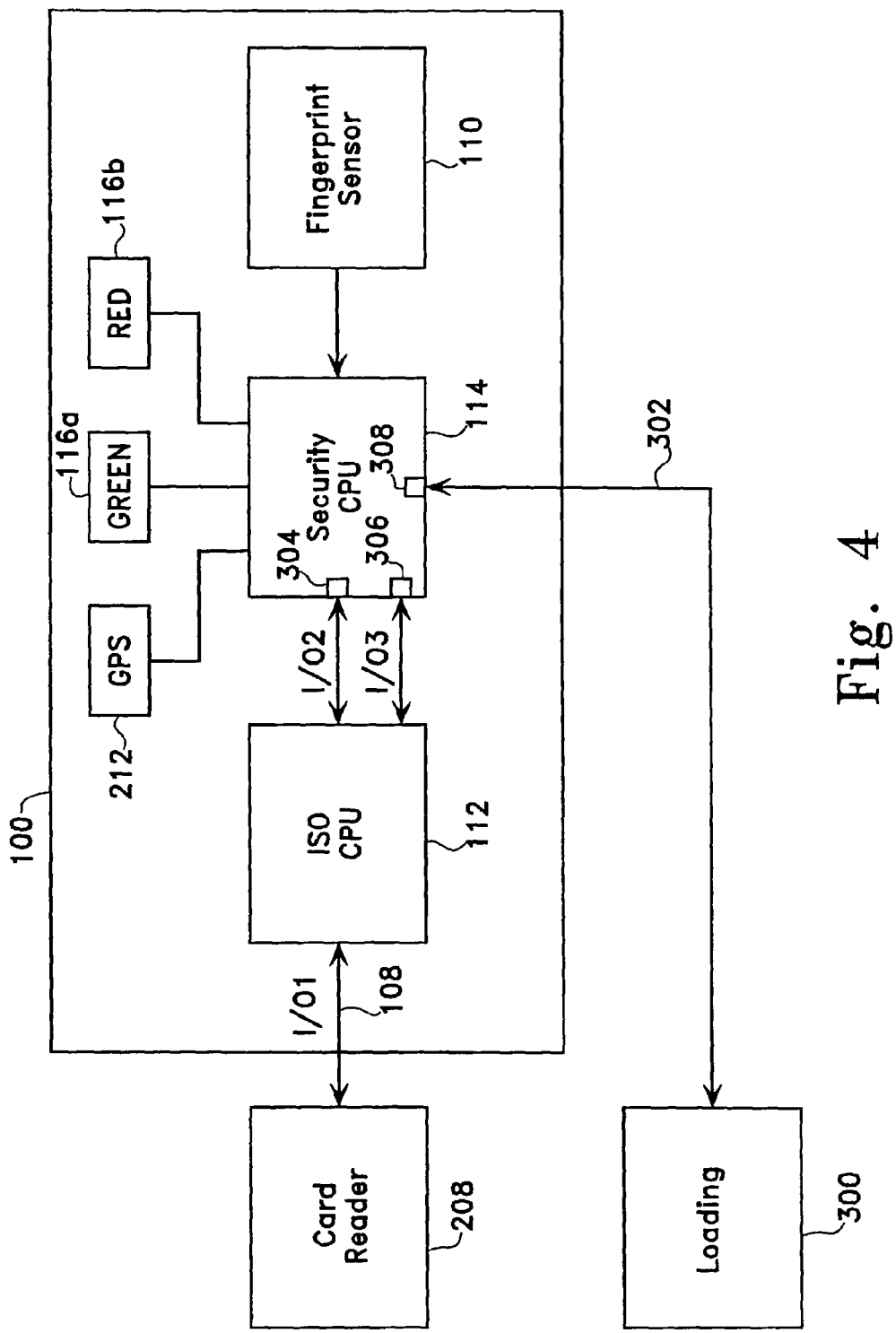
FIG. 4 is a functional block diagram of an exemplary biometric verification card with different physical data paths for use during initial loading of the cardholder's biometric data and during verification of the cardholder's identity to a remote application.

FIG. 4 is a functional block diagram of an exemplary ISO-SmartCard compatible biometric verification card 100 or 100' with different physical data paths for use during initial loading of the cardholder's biometric data and during verification of the cardholder's identity to a remote application.

In particular, in addition to the previously described ISO Processor 112, Security Processor 114, Fingerprint Sensor 110, LED's 116*a*, 116*b* and optional GPS receiver 212, with only ISO Processor 112 being directly connected to Card Reader 208 via ISO SmartCard contact pads 108, there is shown a separate Loading module 300 and associated temporary connection 302, which provides for direct communication with Security Processor 114 during initial User Registration. It may be noted that ISO Processor 112 communicates with Security Processor 114 by means of I/O ports 304, 306, while temporary Loading connection 302 is connected to a separate I/O port 308. Security Processor is preferably programmed such that any sensitive security related data or software are accessible only from port 308 and not from ports 304 and 306, thereby avoiding any possibility of malicious access to these sensitive data after connection 302 has been disabled.

Most commercially available ISO processors have at least two I/O ports and some have at least three. Only one of these ports (I/O 1) is designated for the conventional ISO SmartCard serial data connection 108 to the external ISO compatible Card Reader 208. The extra one or two I/O ports preferably provide a dedicated hardwired communication between the ISO Processor 112 and Security Processor 114 which acts as a hardware firewall to block any malicious attempts to reprogram the Security Processor 114 or to gain access to any sensitive information which may have been previously captured by sensor 110 or which may otherwise be stored within Processor 114. In the particular case of an ISO Processor with more than two I/O lines, it is possible to present more than two states of static status information on the dedicated communication path between the ISO Processor and the Security Processor, such as 1) Ready, 2) Busy 3) Fail, and 4) Pass even when the Security Processor is completely powered down. Of course, even If only one I/O port is available those four conditions can be transmitted dynamically as serial data.

Among the possible commands and data that may be transmitted between the ISO CPU and the Security CPU over the ISO interfaces I/O 2 and I/O 3 are the following:

Commands to enroll or authenticate a User, to which the Security CPU will send result of enrollment or result of authentication for local storage and/or transmission to a remote application.

Fingerprint information as a template (reference) can be sent from Security CPU to ISO CPU for storage in the ISO SmartCard memory for transmission to remote applications. For increased security of sensitive personal information, the reference data can be encrypted by the security CPU before it is sent to the ISO CPU.

Loading connection 302 provides a direct connection to security CPU 114 that bypasses any firewall protection afforded the ISO connection and associated dedicated I/O ports 304 and 306, while possibly maintaining communication between ISO CPU 112 and ISO reader 208 so that power will also be available to Security CPU 114. It is primarily used during initial registration of the card to a particular user, and should be protected against unauthorized access.

Figure 5:
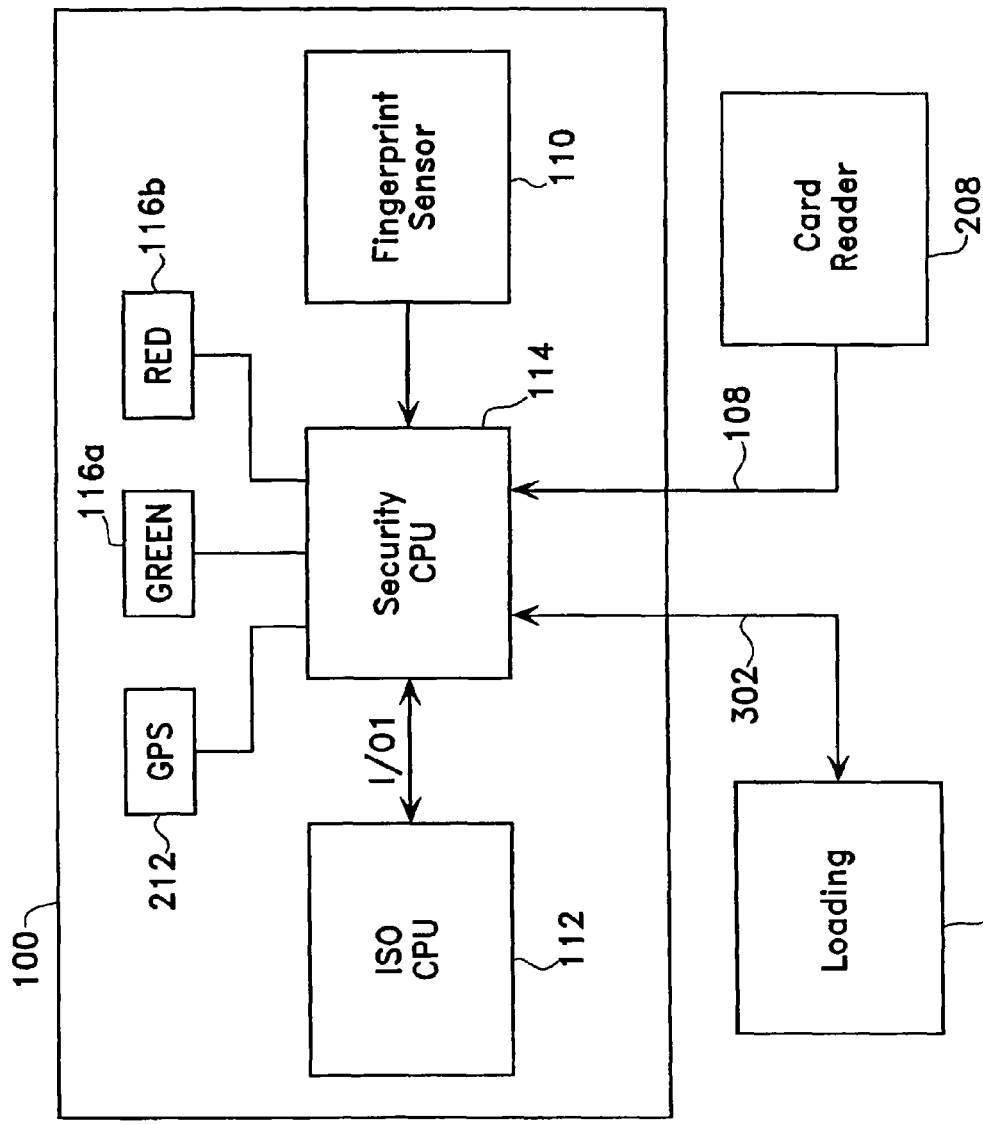
FIG. 5 shows an alternative embodiment to the exemplary biometric verification card of FIG. 4, which is intended for use with an unmodified ISO SmartCard CPU.

FIG. 5 shows an alternative embodiment to the exemplary biometric verification card of FIG. 4, which is intended for use with an unmodified ISO SmartCard CPU. In particular, the ISO CPU 112' no longer must perform any gateway functions between Card Reader 208 and Security CPU 114', either during normal use or during loading, and thus it can be any ISO approved chip, not modified in any way and used only in a manner that is absolutely transparent to both the Card Reader 208 and to any external application. In such an alternative embodiment, Security CPU 114' acts as a transparent firewall between the ISO CPU 112' and any external application if the captured fingerprint matches the stored fingerprint, and blocks all such communication if the captured fingerprint does not match the stored fingerprint.

Card Initialization and Protection of Stored Data Guillotine

In one embodiment, the originally manufactured Card has a protruding printed circuit extension which provides a direct connection to the Security CPU, as well as to at least portions of the ISO interface and/or any discrete on board memory. This direct connection interface is used only for testing card and enrolling fingerprint data and includes the signal which enables the enrollment process. After the enrollment has been completed, this circuit extension is mechanically cut off so that no further enrollment will be possible, and the Security CPU memory is accessible only through the ISO CPU and the previously mentioned Firewall between the ISO CPU and the Security CPU.

Fuse

In another embodiment, the Security CPU has a type of memory which once the enrolled fingerprint pattern is written, will then be inaccessible. One example of such a memory is one time PROM ("OTP") which is similar in construction to EEPROM, but is opaque to UV and thus cannot be erased. Another example is Flash ROM which is rendered read only after enrollment has been completed, for example by applying sufficient current to a portion of the Enable or Address or Data signal path to form a physical break ("fuse") in that signal path.

Exemplary Authentication Processes

In one embodiment, an exemplary authentication process involves capturing physical fingerprint data, for example, using optical or pressure or conductive or capacitive or acoustical or elastic or photographic technologies at the Client Terminal used by the accessing person to connect to the Application Service Server, which is then sent (preferably in encrypted form) to a separate Fingerprint Authentication Server. The Fingerprint Authentication Server compares the captured fingerprint data to a Fingerprint File, which includes the User's registered fingerprint data, using Authentication Software, and if the data is matched the Authentication Server sends an enabling instruction to the Application Service Server.

In another embodiment, the User accesses the secured WEB browser of the Fingerprint Authentication Server, which contains files of fingerprint, where all the fingerprints are pre-registered along with individual data, such as name, address, and date of birth. The secured Fingerprint Authentication Server, which User is accessing through a secure protocol such as HTTPS format, then sends an instruction to the Client Terminal to capture the User's finger print at the Client Terminal. In response to instructions displayed by the browser of the Client Terminal, the User puts his selected finger on the Fingerprint Sensor and the Fingerprint Capture Software residing in the Client Terminal captures a digital fingerprint, for example a pixel-based image with a 25 micron to 70 micron pitch resolution and an area of 12.5 mm to 25 mm square, and further having an 8-bit gray scale.

The Secure Fingerprint Authentication Server receives the fingerprint data along with User ID as well as Internet IP address and/or fingerprint sensor individual code (MAC address) and/or cookie and/or any unique code or other information identifying the particular individual or terminal (for example, details from a previous conversation between Client Terminal and secured Fingerprint Authentication Server), whereupon it compares the received Fingerprint Data to a Fingerprint File, which is the pre-registered fingerprint data along with user ID, individual information such as name, address, date of birth, crime record, drivers license, social security number, etc, using Authentication Software, which may be minutiae comparison and or Fast Fourier Transform Comparison.

At the commencement of the Authentication process, the Web Server 214 for the relevant application visually or audibly instructs the User to put his finger on the Fingerprint Capture Sensor 110 and to click his mouse button or keyboard key to thereby intimate the Fingerprint Capture Software in Security Processor 114. Then the User's captured fingerprint data is sent in encrypted format (for example, using the secure RSA encrypted transmission protocol HTTPS), to Web Server 220 of Fingerprint Authentication Server 204 via the ISO Processor 112 and Web Browser 210 of Client terminal 200. If the captured data is successfully matched to corresponding data in its Database 226, Fingerprint Authentication Server 204 then validates the User's identity to both the Client Terminal 200 and to the Application Server 202.

An exemplary preferred embodiment utilizing a Three Way Authentication Protocol and a Onetime Password as a Hash Character Encoding Sequence will now be described with reference to FIG. 3:

Web Browser 210 of Client Terminal 200 accesses the corresponding Web Interface 214 of Application Server 202 with a request to access Application Process 216.

Web Interface 214 of Application Server 202 responds with LOG-IN screen information and related instructions for accessing Application Process 216.

Client Terminal 200 instructs ISO Processor 112 to activate Security Processor 114.

ISO Processor 112 triggers Security Processor 114.

Security Processor 114 awaits Fingerprint Data from Fingerprint Sensor 110 and when valid data is received, extracts a digital Fingerprint Pattern which is forwarded to Web Browser 210 via ISO Processor 112.

Web Browser 210 sends an encrypted version of the extracted Fingerprint Pattern to Authentication Server 204 accompanied by (or encrypted with) Related Information about the involved Card 100' and Card Reader 208, such as User ID, IP address of Client Terminal 200, and/or hardwired ID code (MAC address) of Sensor 110.

Web Interface 220 of Authentication Server 204, upon receiving the extracted Fingerprint Pattern along with the other information from Client Terminal 200, forwards that information to the Fingerprint Matching Processor 222.

Under the control of Matching Software 224, Fingerprint Matching Processor 222 uses the received User ID or other User specific Related Information to retrieve a corresponding reference Fingerprint Pattern from Database 226 and compares the captured Fingerprint Pattern to the reference Fingerprint Pattern.

The result (Matched or Unmatched) is stored in an Access History log together with the Related Information identifying the Terminal 200, User ID Card 100' and requesting Application 216, and control is returned to Authentication Server Web Interface 220.

If the result is Matched, Authentication Server Web Interface 220 then generates a One Time Password in the form of a Challenge Character Sequence which is transmitted to Client Terminal 200, and uses that Challenge Character Sequence as a Hash code to encrypt the Related Information which it saves as the corresponding Challenge Response for possible future reference.

Client Terminal 200 uses the received Challenge Character Sequence as a Hash code to encrypt a previously stored unencrypted copy of the submitted Related Information, which it then forwards to the Web Interface 214 of Application Server 202 as part of its response to the Application Log-In Process.

Web Interface 214 of Application Server 202 upon receiving Hash converted Related Information, forwards it to the Application Service 216 which associates it with an on going Log-On attempt from that Client Server, and, for the purpose of confirming the Matched result, forwards the received Related Information which was Hashed by the Client Terminal using the Challenge Sequence provided by the Authentication Server as Challenge Response.

The Web Interface 220 of Authentication Server 204, upon receiving the Challenge Response from the Application Server, forwards that Response to the Authentication Process 222 which compares it with its previously saved reference copy of the expected Challenge Response to determine whether the User's Identity has in fact been authenticated.

Any authenticated User Identity information resulting from that comparison is then returned to the Application Process 216 via the Authentication Server Web Interface 220 and the Validation Interface 218 of Application Server 202.

Validation Interface 218 uses the Authentication to confirm the User's Identity as established in the original Log-On attempt has been validated.

Once the User's Identity has been confirmed, Authentication Process 216 then proceeds to communicate directly with Web browser 210 of Client Terminal 200 via Web Interface 214 of Application Server 202.

Figure 6:
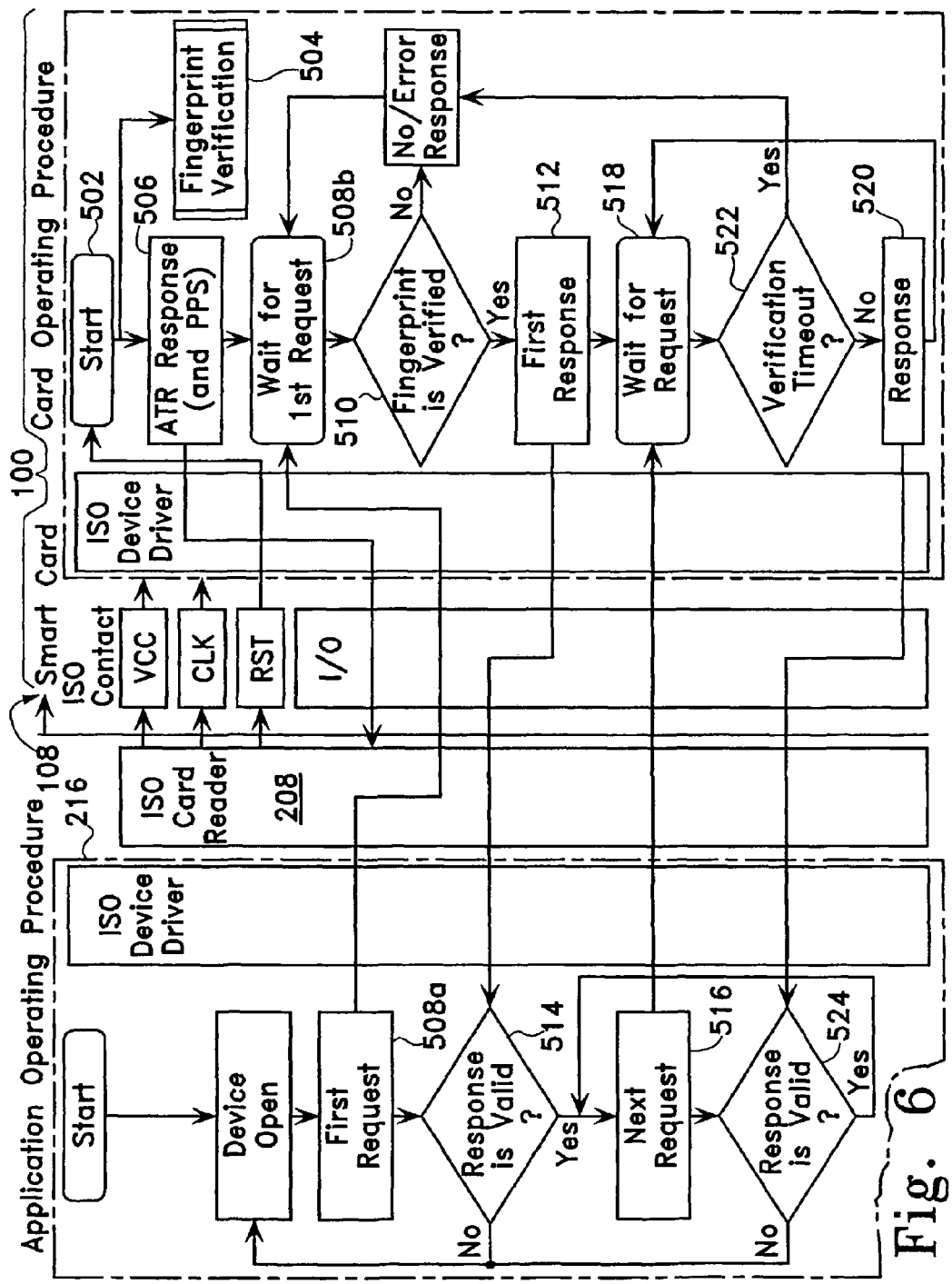
FIG. 6 is a flowchart showing the communication between an exemplary application and an exemplary verification card in which only local verification of the card holder's identity is performed.

FIG. 6 illustrates an alternative authentication process in which all matching is performed on the ISO compatible card of FIG. 4 by the Security CPU 114 and no external Authentication Server 204 is utilized. The left hand side of FIG. 6 shows the functions performed by Application Server 202, while the right hand side shows the functions performed by ISO SmartCard 100.

When a SmartCard 100 is inserted in Card Reader 208, a reset signal RST is sent from the card reader to both ISO CPU (START block 502) and Fingerprint CPU 114 (Fingerprint Verification block 504) and both receive power VCC from the Card Reader 208. ISO CPU then responds with ATR (Answer-to-Reset) message and communicates PPS (Protocol and Parameters Selection) as needed (block 506). At the same time, Fingerprint CPU goes into waiting state for receiving Fingerprint data and when data is received from sensor 110, performs the authentication process (block 504).

When an initial request command is sent by the Application 216 to ISO CPU 112 (block 508) the ISO CPU queries (block 510) Security CPU about the authentication status. If the response is positive, ISO CPU responds to the application by executing the requested command (block 512). Otherwise (either an error message or no response from Security CPU 114) it does not make any response to the requested command but rather waits for a new first request (block 508b).

Assuming the Fingerprint was verified and the first response was received in a timely fashion and determined to be responsive by the Application 216 (block 514), the Request/Response process is continued (blocks 516, 518, 520) until a predetermined Verification Timeout has been exceeded during which no Requests were received from the Application (block 522), or the Application failed to receive an expected response (block 524).

Figure 7:
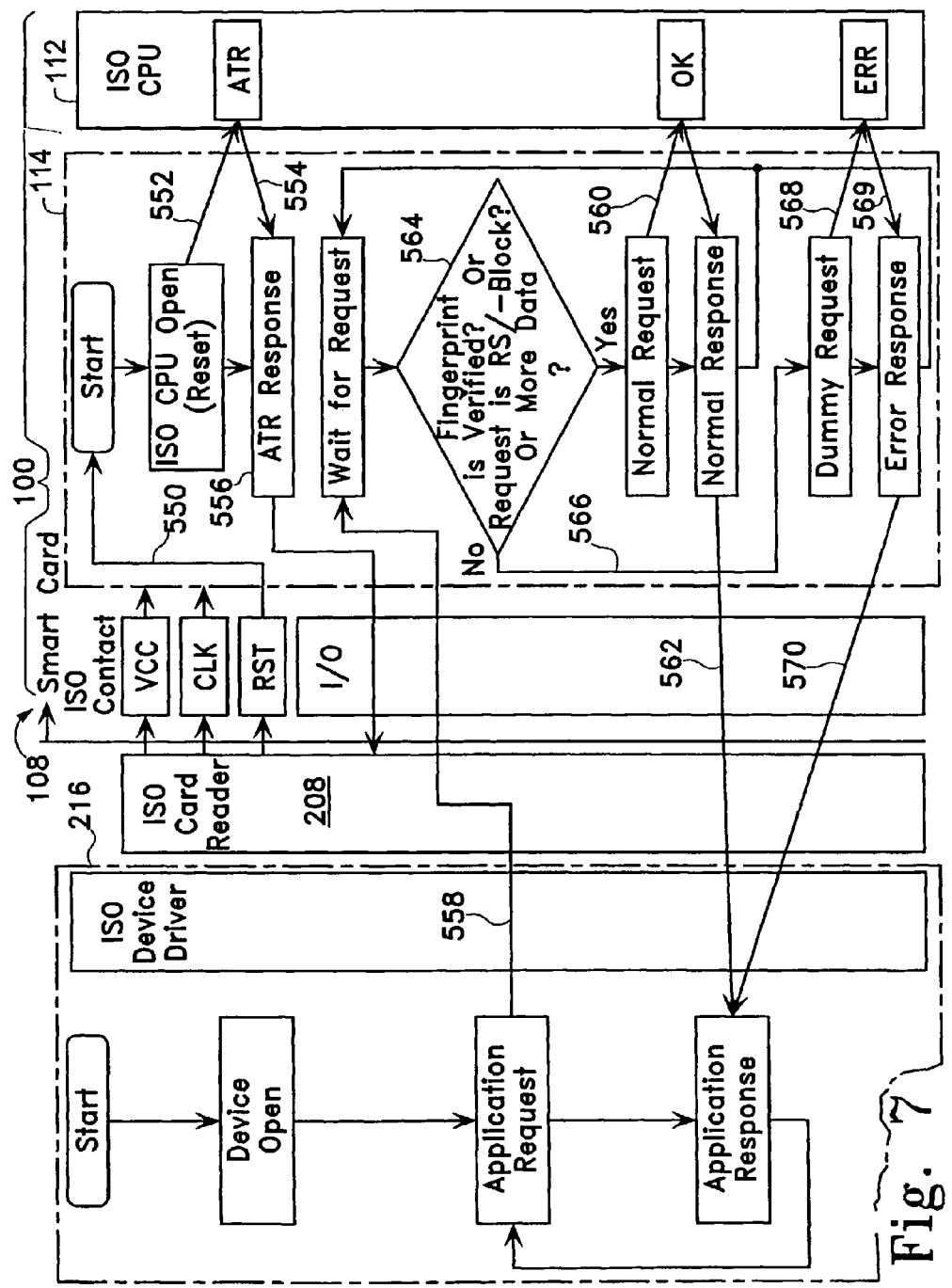
FIG. 7 is similar to the flowchart of FIG. 6, but modified for use with the exemplary biometric verification card of FIG. 5.

FIG. 7 is similar to the flowchart of FIG. 6, but modified for use with the exemplary biometric verification card of FIG. 5. The far left hand side of FIG. 7 shows the functions performed by Application Server 202, the next column corresponds to Reader 208, the next column depicts ISO contacts 108, the next column shows functions performed by Security CPU 114, while the far right hand side shows the functions performed by an unmodified ISO SmartCard CPU 112.

When either a SmartCard is inserted in a card reader or the application software starts operation of card reader device, a Reset Signal 550 is sent from Card Reader 208 to Security CPU 114.

Soon after Security CPU receives Reset Signal 550, it sends a corresponding Reset Signal 552 to ISO CPU 112. Concurrently Security CPU awaits Fingerprint data from Fingerprint Sensor.

Upon receipt of Reset Signal 552, ISO CPU makes an ATR (Answer-to-Reset) response 554 and thereafter communicates PPS (Protocol and Parameters Selection) as needed.

As soon as Security CPU r114 receives ATR (Answer-to-Reset) from ISO CPU, it transfers it to Card Reader (block 556), including any associated PPS commands.

In the meantime, if Security CPU receives fingerprint data, it executes the previously described authentication process. In the event the authentication test results in a PASS, the pass status is maintained for specific time period. If the result is FAIL, Security CPU 114 awaits new fingerprint data.

Upon the application execution, a command request 558 is sent to Security CPU, which transfers a command request 560 to ISO CPU and also transfers its correct response 562 to Card Reader only if the Security CPU is still in the previously mentioned PASS state or if the last correct response had More-data bit set (test block 564).

Otherwise (No branch 566) Fingerprint CPU generates a dummy request 568 and transfers it to ISO CPU and also transfers the resultant ERR response 570 to Card Reader 216, thereby maintaining proper synchronization between the sequence numbers in the requests and responses.

Encryption and Security

Prior to transmission over any external network, any sensitive data and/or the authentication result is preferably encrypted, possibly using DES, or Two Fish encryption. The encryption key can be based on captured or stored fingerprint data, user ID code, sensor's uniquely assigned code, memory address, adjacent data in memory, other functionally related data, a previous conversation (transaction), IP address, terminal code, or an assigned password. Alternatively, the sensitive data may be sent over the Internet using the secure HTTPS protocol.

To provide even greater security, a Virtual private gateway, such as hardware DES encryption and decryption, may be inserted between the secure Fingerprint Authentication Server and the network connection, and correspondingly between the Application Service Server and the network connection. By so using such a Virtual gateway or virtual Private Network ("VPN"), the sensitive data is additionally protected by an additional layer of encryption, for example both DES 128 (typically used in the VPN) and RSA (used by HTTPS).

For especially secure applications, all communications may be wrapped with additional layers of security. In particular, message headers in a lower layer can be encrypted in an upper layer.

Wireless Communication

Other embodiments may include a dual interface for both contact (ISO 7816) and wireless (ISO 1443 A or B) operation, and preferably incorporate a multi-interface power unit that allows interoperability among ISO 7816 contact, ISO 1443 A, ISO 1443 B, ISO 15693 and HID legacy wireless systems (among others) all on one card. Alternatively, the card may include provision for other wireless communications technologies such as Bluetooth (short range) or Cellular (medium range) or microwave (long range).

Reference should now be made to FIG. 8 which shows a smart card with on board biometric verification that can be connected to a local terminal either wireless or by means of an electrical connector. For the most part it is similar in construction and architecture to the previously described embodiment of FIG. 1, and like numbers (possibly distinguished by a single quotation mark) designate similar elements. In particular, ISO CPU 112 is shown in a different location (under rather than to one side of contacts 108), but has a similar functionality as previously described.

ISO antenna 132 comprises two loops generally located about the periphery of card 100 and provides an ISO-compatible wireless interface to ISO CPU 112 for both data and power similar to that afforded by the wired electrical interface 108. In addition, a Security antenna 134 (in the depicted example, inside antenna 132 and consisting of only one loop) provides a separate source of power to Security CPU 114 via a DC-DC power regulator 120. Because the there is no direct connection for wireless data except through ISO CPU 112, the sensitive data stored within Security CPU 114 is not compromised by such a wireless interface. Alternatively, as mentioned previously with respect to the embodiments having only wired connections to the external reader and external network, the functionality of the two processors could be combined, or the external interface could be through the Security CPU 114 rather than the ISO CPU 112, in which appropriate wireless security measures would have to be incorporated into the thus-modified architecture.

FIG. 9 is a cross section through the card of FIG. 8. Note that most of the described components are contained within a central core, 126, with only contact pads 108 extending through upper protective layer 122. The operative area of sensor 110 is accessible through an upper window in upper layer 122 and a lower window in PCB 134 that is disposed between upper layer 122 and central core 126 and which provides the required electrical connections between the various electronic components, as well as a surrounding electrostatic discharge ground contact surrounding the active region of sensor 110.

Also visible is a lower layer 124 and a magnetic strip 128.

Fingerprint sensor.

Figure 10:
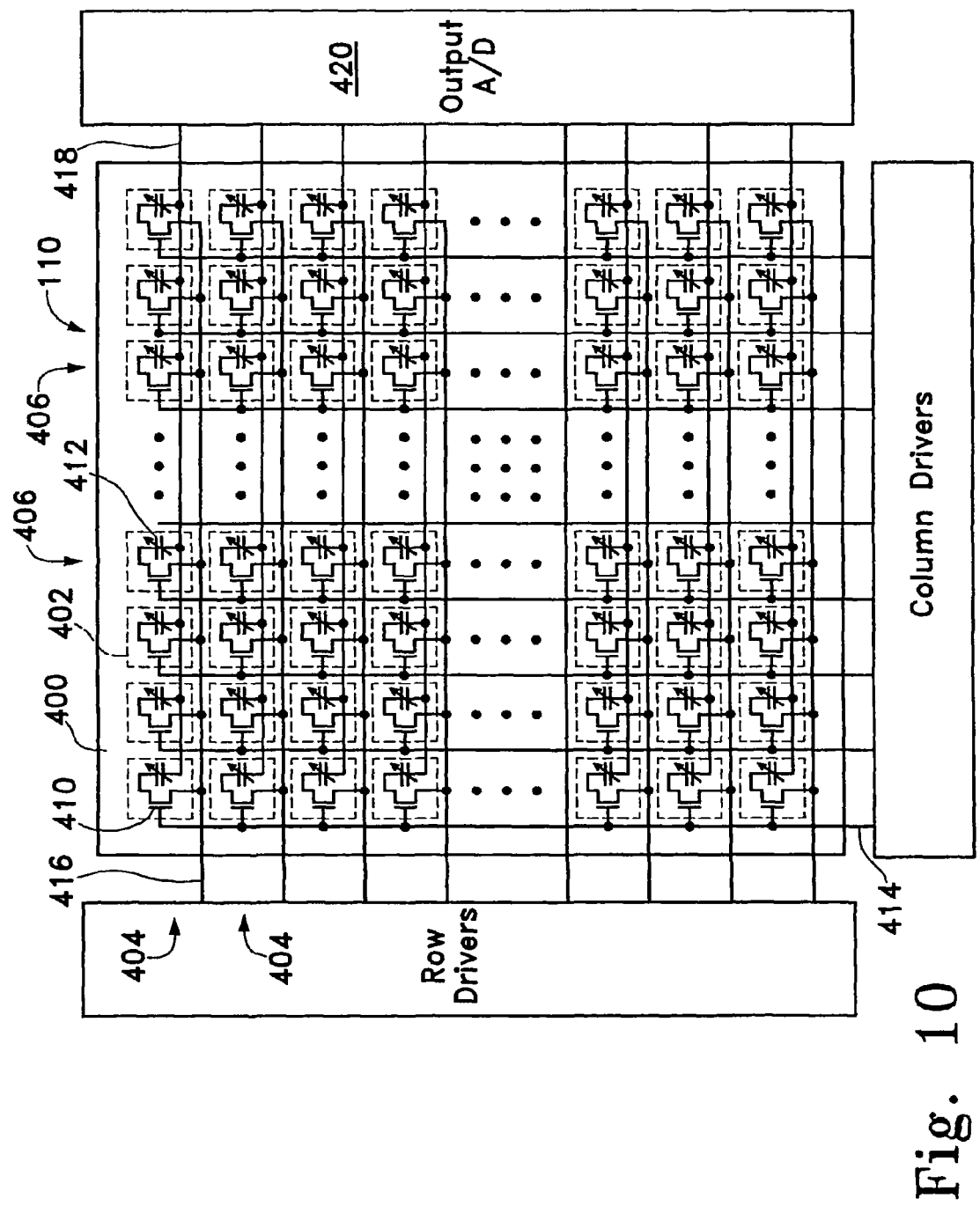
FIG. 10 is a circuit diagram of an exemplary fingerprint sensor.

FIG. 10 is an exemplary schematic circuit diagram for sensor 110, in which an array 400 of sensor cells 402 is arranged in rows 404 and columns 406. As depicted, each cell 402 includes an activation gate 410 and a transducer 412. A Fingerprint is formed by the ridges and valleys of skin on a finger. Each sensor cell transducer 412 experiences a mechanical and/or electrical change when one of these ridges touches the immediate vicinity of cell 402 within array 400, which in effect provides a digital fingerprint image based on micro-pressure variations across the sensor surface caused by the ridges and valleys on the finger tip. Note that although each transducer 412 has been depicted as a single variable capacitor, there are various types of transducers that can respond to the presence of one of these ridges of human skin: In the particular example of a pressure sensitive piezo thin film transducer, the film is deformed in the vicinity the cell and generates a charge which is stored in a capacitor connected to that cell. The voltage on the capacitor is thus a function of the mechanical stress formed by the deformation of piezo material, which in turn is a function of whether a mountain or a valley is above the cell. When a signal from the associated column driver 414 switches that cell's gate 410 ON and the associated row driver 416 is grounded, that voltage appears on the row's output line 418, and is converted to an 8-bit digital signal in Output driver 420. For maximizing detection of deformation of piezo material, the piezo electric material may formed on elastic material, such as polyimide or may simply be a polyimide piezo electric material. Other exemplary analog transducer technologies that can be implemented with a similar array organization include variable resistance and variable capacitance. Alternatively each cell could consist of a simple digital switch which provides only single bit of information; in that case, additional bits of information can be generated by providing more cells in the same area or by sampling each cell at a higher frequency. Such an alternate embodiment avoids the need for any A/D converters.

In an exemplary embodiment, the sensor is only 0.33 mm thin and is durable enough to be embedded in a SmartCard and is not effected by static electricity, the elements or the condition (wet, dry, hot, cold) of the user's skin. A typical unit cell size of Sensor 110 is 25 micron to 70 micron and a typical pitch is 25 micron to 70 micron. The exemplary sensor has a sensing area of 12.5 mm to 25 mm square and an 8-bit multi level of sensitivity. Such sensor can be manufactured by array of TFT (Thin Film Transistor) and pressure sensitive capacitor, such as formed by Thin Film piezo material, such as titanium barium oxide or strontium barium oxide, and includes an upper electrode which covers and protects the entire sensing area. If mechanical stress is applied, a corresponding charge is generated and stored in the Thin Film piezo capacitor. Alternatively, a pressure-based sensor can be manufactured as an array of TFT (Thin Film Transistor) along with thin film capacitor, and Pressure sensitive capacitor, such as formed by sheet of pressure conductive material, such as carbon fiber dispersed rubber sheet, metal (such as Copper or Tin or silver), plated carbon fiber or glass fiber based paper, or metal, dispersed elastic material (such as silicone), and an upper electrode sheet, which covers entire sensing area.

Row and Column drivers 416, 414 which particular specified fingerprint sensor element 402 is outputting the electrical data to the Output circuitry 420 thereby converting the physical input representative of the user's fingerprint to analog electrical data. An A/D converter in the Output circuitry 420 then convert the analog electrical signal to digital electrical signal. Each thin film transistor selectively switches a shared row interconnection to the voltage on its associated capacitor, thus the voltage on each capacitor can be read and thereby each cell's deformation can be measured. An entire column of thin film transistors is preferably switched simultaneously, and thus a number of cells (for example 8) in one selected column can be read in parallel on different row interconnections. The interconnection of multiple gates as rows and columns reduces the number of interconnections, while the parallel read out of multiple cells from different rows of the same column reduces the read time for the entire array. The output voltage from the sensor can be amplified by a differential amplifier. The output of such amplifier can be sampled and held for Analog to Digital Conversion (A/D converter).

Substrate can be glass (such as non alkaline glass), stainless steel, Aluminum, Ceramics (such as Aluminum Oxide), Paper, Glass Epoxy, but is preferably a thin sheet of Crystal Silicon. Thin film semiconductor material can be Amorphous Silicon, Polysilicon, Diamond, or any other Semiconductor Thin Film. Piezoelectric Material can be a piezoelectric ceramic, such as lead-zirconate-titanate (PZT) thin films, preferably ranging in thickness from 0.1 to 50.0 microns, or a polymer piezoelectric polyimide thin-film material. Interconnection Material may be: Ti/Ni/Cu, Al, Cr/Ni/Au, Ti/Ni/Au, Al/Au, W/Cu, W/Au, W/Au.

Figure 11:
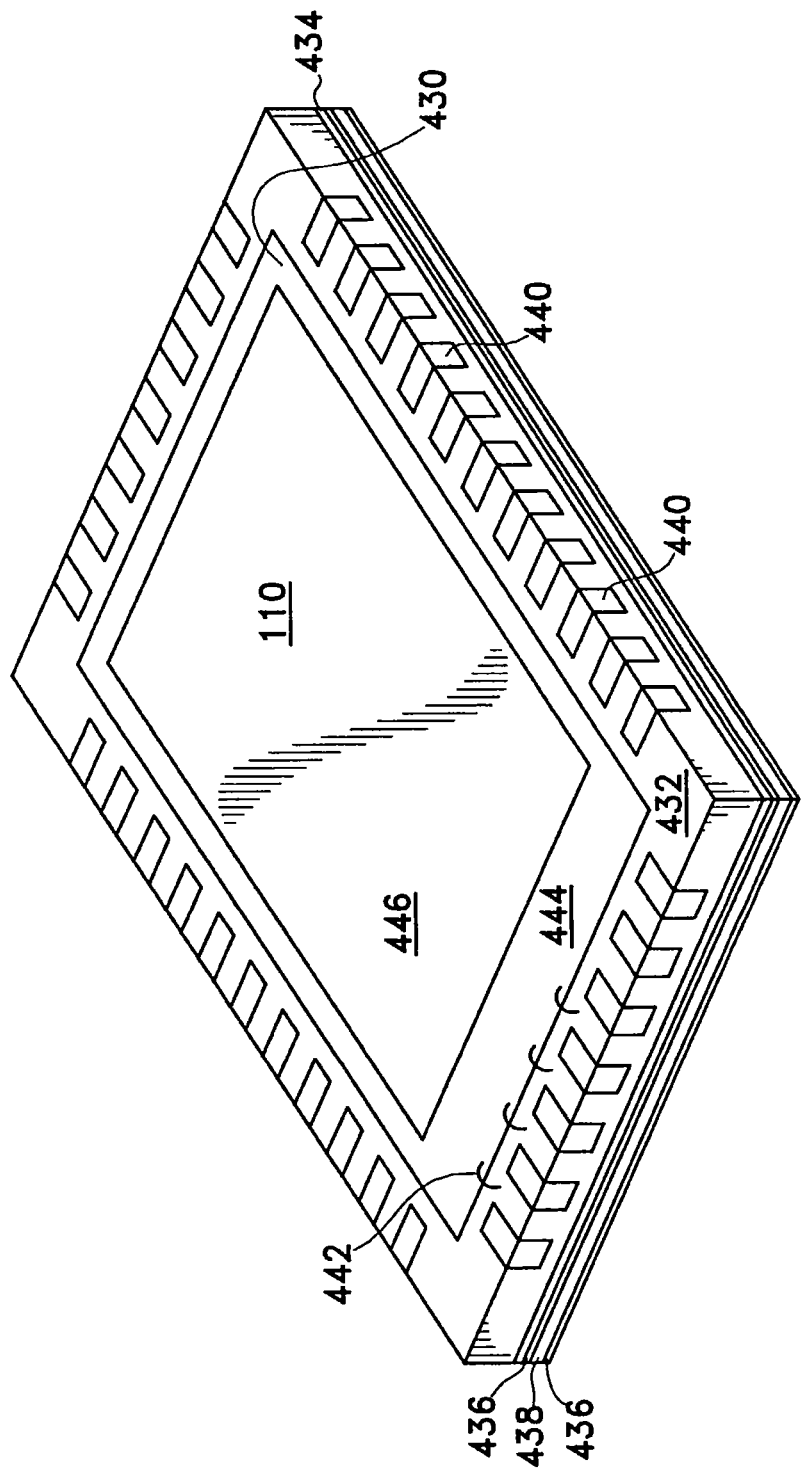
FIG. 11 shows one embodiment of a carrier assembly for the sensor of FIG. 10.

FIG. 11 shows a carrier assembly for a sensor formed on a thin substrate of crystalline silicon. Crystalline silicon has excellent electrical properties and facilitates integration of the sensor array with the required driver and output circuits, however a relatively large and thin sheet of silicone will flex and fracture when subject to localized surface pressure. The illustrated carrier provides a much stiffer structure than would be provided with a sheet of silicon of the same overall thickness.

As shown, the monolithic sheet of silicon 430 is about 0.1 mm in thickness, and is surrounded by an equally thick frame 432 of glass epoxy, which is mounted on a backing plate 434 also of glass epoxy construction and about 0.05 mm in thickness. Frame 432 and backing plate 434 may be readily constructed using conventional printed circuit board (PCB) technology. In particular, the upper and lower surfaces of backing plate 434 are covered with a thin copper layer 436 separated by a glass epoxy core. Frame 432 includes a number of solder pads 440 about its outer periphery, for connection to Security Processor 114. The thin silicon chip 430 is epoxy bonded to frame 432 and plate 434, and the active regions are electrically coupled to respective electrical traces in the frame 430 by conventional wire bonding 442 at the exposed outer edge portions 444 of the silicon 430 surrounding the protective upper electrode 446.

Matching Algorithms

For local on-board processing where processing power is limited and only a simple 1:1 match with a single reference sample is being attempted, the fingerprint-matching software can be based on a relatively straightforward comparison of Minutiae derived from the two patterns. For example, the gray-scale image of a fingerprint is may be reduced to two values, white and black, and 3 dimensional ridges are converted into two dimensional thin lines (vectors). The accuracy of the method is therefore subject to, among other problems, blurring, conglutination, distortion, partial lacking of line segments and other effects. Although the Minutiae method is in principle less accurate, it requires fewer computational resources and offers the possibility of compatibility with many existing databases.

For processing at a remote Authentication server where more processing power is available and more accurate discrimination may be required, for example a "POC" (Phase Only Correlation) matching algorithm. POC is an identification algorithm based on macroscopic matching of whole images. POC, conversely, matches structural information across a wide range—from details to the total image. Hence, POC is able to provide robust accuracy against noises such as conglutination and partial hiatus. In principle, the POC method is free from the adverse effects of positional shift and differences in brightness, is fast (about 0.1 seconds for an offline match) and is highly accurate. For example, the POC software may perform a space frequency comparison of the two fingerprint patterns utilizing a two-dimensional Fast Fourier Transform ("2DFFT"). 2DFFT converts an array of digitized data representing a physical two dimensional distribution of fingerprint, into frequency space, in other words, reverse space distribution, where higher density pattern has higher space frequency. A rotational transformation may be used to match the frequency space pattern matching. POC pattern matching has the further advantage Minutiae vector matching, because is not misled by common defects in the recorded fingerprint pattern which POC would recognize as noise but a Minutiae analysis would interpret as meaningful data.

For particularly demanding applications, a hybrid approach may offer even greater accuracy and security than either method alone. For example, a minutiae methodology can be used at the point of capture, while a POC methodology can be used at a remote server. As another example, the matching process can analyze both the minutiae and the spatial relationships to produce a combined score that takes into account the results of both.

Applications

The above-described technology provides a high level of security for multiple applications, both commercial and governmental. Depending on the requirements of each application, multiple secure applications may co-exist and operate on the same card and/or on the same authentication server. In one embodiment, a single card can contain up to 24 independent and secure applications. For example, the technology will permit/deny access (physical and/or logical), identify precise location and/or movement of personnel and/or watch list parties while at the same time operating other secure applications, each completely and securely isolated one from the other.

Among the applications currently contemplated are the following:
  Airport ID/Access
  Building Security
  Hotel Room Access and Billing
  Hospital
  On line Gaming
  Downloaded entertainment
  Birth Certificate
  Computer Access
  Driver's License—TWIC Electronic Wallet
Emergency Medical Information
Explosives License
Government & Military Facility Access
HAZMAT License
Medicare & Benefits Card
Parking Access
Passport
Pilot's License
Port ID/Access
Proof of Insurance
Social Security Card
Trusted Traveler Card
Visa or Entry/Exit pass
Voter Registration Card
Welfare & Food Stamp Card For many of these applications, the card's on-board memory preferably also provides secure storage of various kinds of private personal information, which is accessible only when the registered cardholder has proven his identity and authorized such access. Examples of such private information are:

Administrative information such as name, address, birth date, place of birth, nationality, religion, organizational memberships, social security number, drivers' license number, passport number, and immigration information such as visa type, visa expiration, citizenship etc.

Financial information, such as electrical wallet, Visa, MasterCard, American Express, etc. credit card information, bank information such as name of bank, balance of bank, money transfer information, IRS number, bankruptcy record, money transfer information etc.

Physiological or health information such as: biometrics information to identify individuals such as height, weight, fingerprint, iris, retina, hand size, bone structure, voice, DNA; blood type; medical diagnostic test results; medical history; medications; insurance information; psychological and physiological responses to certain stimuli, etc.

Event Information such as criminal record, felony, misdemeanor, infractions.

Emergency information such as cemetery, relative and other contact information, lawyer information, religious information.

Education, work history, including school to attend, degree, company worked related to FDD.

Data access history (stores the data of access history in and out of card).

ID related information such as fingerprint pattern, processed fingerprint pattern, results of fingerprint pattern.

Passwords such as a permanent password, a temporary password, and/or a one time pass word.

Encryption keys such as a public key, a personnel key, and/or a one time key.

An exemplary card enrollment system will now be described.

The applicant: fills out an application and submits it, preferably including a photograph and fingerprint. For most applicants, an inspection of their breeder documents and a simple crosscheck of the submitted information against one or more available government and commercial databases should be sufficient to establish the individual's true identity.

After his identity has been so verified, the applicant proceeds to an issuing station where any information deemed necessary by the card issuer is loaded onto the card. The applicant puts their fingerprint on the sensor on the card. Once the fingerprint is satisfactorily placed on the sensor and loaded onto the card, the tab on the card then gets a jolt of electricity which burns out certain fuses that prevent anyone from writing to that certain area of the card ever again. Then, the burned tab can be removed and at that point, the card can only be read or written to through the ISO contact reader or ISO wireless system.

In the case of a networked Authentication server, some or all of the same data that is loaded onto the card is also transmitted in encrypted form to the remote server, possibly supplemented with additional data that is not normally stored on the card but that may be required for certain high security applications.

What is claimed is:

1. An identification card comprising:
   an on-board memory for storing reference data;
   an on-board sensor for capturing live biometric data;
   an on-board microprocessor for comparing the captured biometric data with corresponding stored reference data within a predetermined threshold and for generating a verification message only if there is a match within the predetermined threshold;
   means for encrypting the verification message according to an encryption key generated by the identification card, the encryption key being substantially unique to the identification card; and
   means for communicating the encrypted verification message to an external network.

2. The identification card of claim 1, wherein the verification message includes at least excerpts from the stored reference data.

3. The identification card of claim 1, wherein the on-board processor is configured to perform matching of the captured biometric data with corresponding stored reference data completely, such that the captured biometric data is not required to be transmitted to the external network in order to complete the matching.

4. The identification card of claim 1, wherein the means for communicating comprises an interface and wherein the verification message includes at least excerpts from the captured biometric data, the verification message being transmitted to a remote authentication system for additional verification using reference data which is different from the reference data stored on the on-board memory.

5. The identification card of claim 4, wherein the on-board microprocessor uses a different matching algorithm than that used at the remote authentication system.

6. The identification card of claim 1, wherein the identification card is ISO SmartCard compatible.

7. The identification card of claim 6, wherein the on-board processor is a security processor for storing and processing the protected biometric data, and wherein the identification card further comprises an ISO SmartCard processor.

8. The identification card of claim 7, wherein the security processor is functionally separated from the ISO SmartCard processor by a firewall, such that any communications between the external network and either of the security processor or the ISO SmartCard processor pass through the firewall.

9. The identification card of claim 7, wherein the security processor comprises: a first connection used for loading data during a loading process; and a second connection connected to the external network.

10. The identification card of claim 9, wherein the first connection is configured to be permanently disabled after the loading process has been completed.

11. The identification card of claim 7, wherein the identification card comprises a magnetic stripe region and an embossed region, wherein the biometric sensor comprises a fingerprint sensor, and wherein the security processor, the ISO SmartCard processor, and the fingerprint sensor are located in a middle region between the magnetic stripe region and the embossed region.

12. The identification card of claim 1, wherein the biometric data includes fingerprint data, the on-board sensor is a fingerprint sensor that captures data from a user's finger placed on the fingerprint sensor, and the identification card provides real-time feedback for finger placement while the user is manipulating his or her finger over the fingerprint sensor, thereby facilitating an adequate placement of the finger over the fingerprint sensor.

13. The identification card of claim 1, wherein the biometric data includes fingerprint data, the sensor is a fingerprint sensor that captures data from a user's finger placed on the fingerprint sensor, and wherein the on-board microprocessor is configured to use a hybrid matching process in comparing the captured biometric data with corresponding stored reference data, wherein the hybrid matching process depends on both minutiae and overall spatial relationships in the fingerprint data.

14. The identification card of claim 1, wherein the biometric data includes fingerprint data, the on-board sensor is a fingerprint sensor that captures data from a user's finger placed on the fingerprint sensor, and wherein the fingerprint sensor further comprises a sheet of crystalline silicon supported by a backing plate.

15. The identification card of claim 14, wherein the backing plate comprises a glass epoxy layer between two metal layers and the backing plate is reinforced by a carrier frame surrounding the sheet of crystalline silicon.

16. The identification card of claim 1, wherein the card further comprises means for restricting use of the identification card to a predetermined location.

17. The identification card of claim 1, wherein at least some of the captured biometric data and the reference data are transmitted to a separate authentication server, as part of the encrypted verification message, for secure verification of a user's identity prior to any grant of on-line access to an application server for processing of secure financial transactions involving that user.

18. The identification card of claim 1, wherein the on-board microprocessor generates the verification message as a function of the live biometric data.

19. The identification card of claim 1, wherein the encryption key is generated as a function of the live biometric data.

20. The identification card of claim 1, wherein the encryption key is generated as a function of the stored reference data.

21. The identification card of claim 1, wherein the encryption key is generated as a function of at least one of: a user identification code, a uniquely assigned code of the on-board sensor, present contents of a predetermined memory location, or an assigned password.

22. The identification card of claim 1, wherein the means for encrypting comprise means for encrypting the verification message according to a Data Encryption Standard (DES) or Two Fish encryption protocol.

23. A method for identifying a user of an intelligent identification card, the intelligent identification card including an on-board memory storing reference data and an on-board biometric sensor, the method comprising:
　capturing live biometric data using the on-board sensor;
　comparing the captured biometric data with corresponding reference data stored in the on-board memory within a predetermined threshold;
　generating a verification message only if there is a match within the predetermined threshold;
　encrypting the verification message according to an encryption key generated by the intelligent identification card, the encryption key being substantially unique to the intelligent identification card; and
　communicating the encrypted verification message to an external network.

24. The method of claim 23, wherein a matching process used in the identification card is different from a matching process used by the remote authentication system.

25. The method of claim 23, further comprising:
　transmitting at least some of the captured biometric data and the reference data to a separate authentication server for secure verification of a user's identity prior to any grant of on-line access to an application server for processing of secure financial transactions involving that user.

26. The method of claim 23, further comprising:
　receiving a match request relating to a particular logon attempt at a particular application server; and
　executing, if a positive match is produced at an authentication server in response to the match request, a secure three-way authentication protocol, the authentication protocol including:
　a) sending a challenge character sequence from the authentication server to the identification card;
　b) generating, at the identification card, a challenge response based on the challenge character sequence and the match request;
　c) forwarding the challenge response to the application server;
　d) forwarding the challenge response from the application server to the authentication server; and
　e) verifying, at the authentication server, whether the challenge response is valid.

27. The method of claim 23, wherein the verification massage includes at least excerpts from the captured biometric data, and further comprising:
　additionally verifying the user at a remote authentication system using reference data which is different from the reference data stored on the on-board memory.

28. An apparatus for identifying a user of an intelligent identification card, the intelligent identification card including an on-board memory storing reference data and an on-board biometric sensor, the apparatus comprising:
　means for capturing live biometric data using the on-board sensor;
　means for comparing the captured biometric data with corresponding reference data stored in the on-board memory within a predetermined threshold;
　means for generating a verification message only if there is a match within the predetermined threshold; and
　means for encrypting the verification message according to an encryption key generated by the intelligent identification card, the encryption key being substantially unique to the intelligent identification card; and
　means for communicating the encrypted verification message to an external network.

29. The method of claim 28, wherein the verification message is transmitted to a remote authentication system for decryption according to a remotely stored decryption key that is different from the encryption key.

30. The method of claim 28, wherein:
　the verification message includes at least excerpts from the captured biometric data; and the verification message is transmitted to a remote authentication system for additional verification using remotely stored reference data which is different from the local reference data stored on the on-board memory.

* * * * *